United States Patent [19]
McCreight

[11] Patent Number: 5,977,227
[45] Date of Patent: Nov. 2, 1999

[54] METHOD FOR FORMING AQUEOUS DISPERSIONS OF KETONE RESINS

[75] Inventor: Marion E. McCreight, West Carrollton, Ohio

[73] Assignee: NCR Corporation, Dayton, Ohio

[21] Appl. No.: 08/940,933

[22] Filed: Sep. 30, 1997

[51] Int. Cl.$^6$ ............................. C08L 91/06; C08L 61/02; C08K 5/053; C08K 5/06

[52] U.S. Cl. ................... 524/277; 524/276; 524/379; 524/385; 524/386; 524/487; 524/489; 524/542; 524/376; 524/377

[58] Field of Search ................... 524/542, 276, 524/277, 592, 502, 487, 488, 489, 379, 385, 380, 376, 377

[56] References Cited

U.S. PATENT DOCUMENTS

| | | | |
|---|---|---|---|
| 3,663,278 | 5/1972 | Blose et al. | 524/39 |
| 3,819,528 | 6/1974 | Berry | 510/393 |
| 4,014,833 | 3/1977 | Story | 524/377 |
| 4,102,845 | 7/1978 | Schröder et al. | 524/276 |
| 4,169,823 | 10/1979 | Jones | 524/502 |
| 4,396,522 | 8/1983 | Callicott et al. | 510/193 |
| 4,644,028 | 2/1987 | Fischer et al. | 524/376 |
| 4,923,749 | 5/1990 | Talvalkar | 428/341 |
| 5,552,231 | 9/1996 | Talvalkar et al. | 428/484 |
| 5,643,992 | 7/1997 | Northey | 524/377 |
| 5,681,379 | 10/1997 | Talvalkar et al. | 106/19 D |

*Primary Examiner*—Peter A. Szekely
*Attorney, Agent, or Firm*—Millen, White, Zelano & Branigan, P.C.

[57] ABSTRACT

Room temperature stable aqueous dispersions of ketone resins are prepared by dissolving poly(ethylene oxide) resin and optionally surfactant in the aqueous medium mixed with the ketone resin. Coating formulations with these dispersions can contain additional co-dispersed components such as waxes, additional resins and/or pigments. The coating formulations can provide thermal transfer layers of thermal transfer ribbons which contain both wax and ketone resins.

19 Claims, No Drawings

METHOD FOR FORMING AQUEOUS DISPERSIONS OF KETONE RESINS

FIELD OF THE INVENTION

The present invention relates to the formation of aqueous dispersions of ketone resins which are stable at room temperature. Such aqueous dispersions have many industrial applications, including use in coating formulations that provide ink layers for print ribbons.

BACKGROUND OF THE INVENTION

Ketone resins are known to provide beneficial properties in coatings, such as adhesiveness improvers in paints. Ketone resins are typically applied to substrates as part of an organic solvent based coating formulation. Economics, environmental regulations and safety concerns have encouraged the replacement of volatile organic solvents with water in most industrial processes. However, ketone resins are often difficult to incorporate in water-rich and water-based coating formulations and can not be dispersed in water without the use of special procedures such as those described in U.S. Pat. No. 4,644,028, where the ketone resin is melted, emulsified and dispersed, after a protective colloid is formed with or on the ketone resin. These methods increase cost and can influence the effectiveness of the ketone resin due to the need to employ a colloid forming material. The difficulties with incorporating ketone resins in aqueous dispersions are magnified where the resin is to be co-dispersed with other components such as a wax. Ketone resins are typically incompatible with some conventional components of coating formulations, such as carnauba wax and paraffin wax.

In some industries limits on the ability to disperse ketone resins in water is a problem, particularly where competing products can be made overseas where there are no restrictions on the use of volatile organic solvents to solubilize or disperse ketone resins. For example, in thermal transfer printing, where images are printed by heating precise areas of a print ribbon for transfer of ink to a receiving substrate, it is often desirable to use ketone resins to provide images with enhanced print quality and resistance to smearing and scratching. However, ketone resins have been found to precipitate, even from mixtures of alcohol and water, particularly where carnauba wax is used.

Extensive work has been done to develop water-rich and water-based coating formulations to replace organic solvent-based systems in forming functional layers for thermal transfer ribbons to improve safety, reduce costs and simplify compliance with environmental regulations and restrictions. See, for example, U.S. Pat. No. 4,923,749, issued to Talvalkar. However, effective, simple methods for incorporating ketone resins in aqueous solutions, particularly in combination with carnauba wax, has not been achieved.

Poly(ethylene oxide) is a water soluble polymer with a large number of polar groups. This polymer has been employed in aqueous-based and organic-based coating formulations to enhance the physical properties of the resulting coatings. For example, the use of poly(ethylene oxide) in polymer solutions of polyethylene is said to provide coatings with enhanced scuff resistance, as disclosed in U.S. Pat. No. 4,169,823. In U.S. Pat. No. 4,102,845, the use of low molecular weight poly(ethylene oxide)s in styrene butadiene polymer dispersions is said to form coatings for paper with improved surface characteristics. Poly(ethylene oxide) polymers have also been used to reduce gelling within aqueous solutions (see U.S. Pat. No. 4,396,522) and allow the replacement of natural binders with synthetic binders in coatings (see U.S. Pat. No. 4,102,845). These resins have been used in flexographic inks (see U.S. Pat. No. 4,014,833), pressure sensitive adhesives (see U.S. Pat. No. 5,643,992) and functional layers of thermal transfer ribbons.

SUMMARY OF THE INVENTION

It is an object of the present invention to provide a simple method for preparing aqueous dispersions of ketone resins which are stable at ambient temperature.

It is another object of the present invention to provide a simple method for preparing stable aqueous dispersions of ketone resins, co-dispersed with another component such as wax.

It is still another object of the present invention to provide aqueous dispersions of ketone resins which are stable at room temperature with little or no organic solvent and coating formulations obtained therefrom.

It is an additional object of the present invention to provide aqueous dispersions which are stable at room temperature and which contain both high levels of ketone resins and high levels of carnauba wax and coating formulations obtained therefrom.

It is a further object of the present invention to provide water-based coating formulations containing ketone resins and wax that form thermal transfer coatings of thermal transfer ribbons and the ribbons obtained therefrom.

Upon further study of the specification and appended claims, further objects and advantages of this invention will become apparent to those skilled in the art.

The above objects are achieved through the methods, dispersions and coating formulations and thermal transfer ribbons provided by this invention.

In a method aspect, there are provided processes for the preparation of stable aqueous dispersions of ketone resins. These processes comprise agitating a ketone resin with water in the presence of poly(ethylene oxide) resin. Agitation is preferably preformed without heating. Water comprises at least 90 wt. % of the liquid component of the dispersions produced. The ketone resin is preferably used in an amount of at least 7.5 wt. %, based on the weight of the dispersion produced. The amount of poly(ethylene oxide) resin present preferably comprises from 3 wt. % to 12 wt. %, based on the weight of the dispersion produced. In preferred embodiments, at least 0.1 wt % surfactant, based on the weight of the dispersion produced, is also used. The amount of surfactant preferably ranges from 0.1 to 5 wt. % based on the weight of the dispersion. Preferably, the amount of ketone resin within the aqueous dispersion ranges from 30–90 wt %, based on total solids and the amount of poly(ethylene oxide) within the aqueous dispersion ranges from 5–40 wt %, based on total solids.

In a composition aspect, there are provided stable aqueous dispersions of ketone resins containing at least 15 wt % solids and coating formulations obtained therefrom. Each contain a liquid component which comprises at least 90 wt. % water, a ketone resin with a melting point less than 300 C., which is insoluble in water, non-dispersible in pure water at ambient temperature and dispersible in pure water at temperatures above ambient temperature, and an amount of a water soluble poly(ethylene oxide) resin effective to allow the ketone resin to be dispersed in water at ambient temperature. The dispersions may contain a surfactant and/or an alcohol solvent.

Coating formulations which comprise an aqueous dispersion of this invention and a wax are also provided. These coating formulations preferably contain additional components such as one or more sensible materials. When used, the sensible material preferably comprises 10–40 wt. % of the total solids (dry components) of the coating formulation. The wax preferably comprises 10–75 wt. % of the total solids (dry components) and most preferably comprises 15–45 wt. % of total solids. The wax is either water soluble, water dispersible or water emulsifiable and includes carnauba wax and paraffin wax. Formulations of this invention can provide thermal transfer layers of thermal transfer ribbons, even when free of organic solvent.

The thermal transfer media of the present invention are comprised of a flexible substrate and a thermal transfer layer. The thermal transfer layer comprises a sensible material and a binder which comprises a ketone resin and wax and optionally a surfactant.

DETAILED DESCRIPTION

The ketone resins used in the methods and compositions of this invention have a melting/softening point of less than 300 C., preferably less than 250 C., and are obtained by condensing a ketone of a relatively simple structure having therein 3 to 10 carbon atoms, such as dialkyl ketones, cycloalkylene ketones, alkyl aryl ketones and diaryl ketones, acetone, methyl ethyl ketone, methyl naphthyl ketone, propiophenone, cyclohexanone, methyl cyclohexanone, p-tertbutyl cyclohexanone or acetophenone with or without a lower aliphatic aldehyde, typified by formaldehyde and acetaldehyde, propionaldehyde, butylaldehyde, typically in a ratio of 1:1 to 2:1. Ketone resins from various ketones and aldehydes are commercially available. Heating a ketone with an aldehyde to a temperature of about 60 to about 100 C. in the presence of an alkaline catalyst (e.g., sodium hydroxide, potassium hydroxide, etc.) results in dehydrocondensation to give a ketone resin through the formation of methylol derivatives as illustrated below.

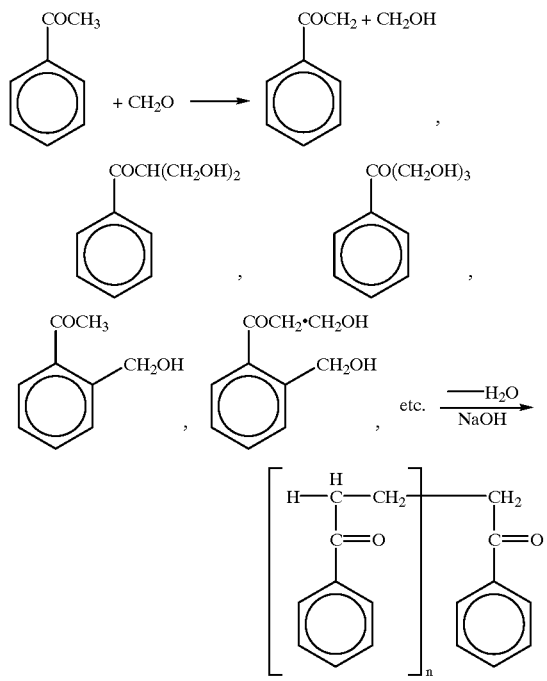

From these many methylol derivatives, a ketone polymer is formed having a complicated methylene linkage derived from the many methylol groups.

The ketone resins which can be used in the present invention are insoluble and non-dispersible in water at ambient temperature but have the ability to disperse in pure water at temperatures above ambient temperature. These ketone resins typically have a softening point of about 70 C. to about 140 C., most preferably about 80 C. to about 110 C. The acid value for these ketone resins is typically below 1 and can be practically neutral. In addition, these ketone resins are typically colorless but can show faint yellow coloration (Gardener Color Number −1). An example of a suitable commercially available resin is K-1717 ketone resin (softening point 98 C., acid value:practically neutral) a product of Lawter International Inc. U.S. Pat. No. 4,205,018 gives as examples of commercially available ketone resins, HILAC 100 ketone resin and HILAC 111 keytone resin (products of Hitachi Chemical Co., Japan) with acid values below 1 and m.p. of 110 C. and 110–120 C., respectively; KUNZHARZ AFS keytone resin (a product of Bayer); Resin MS 2 (a product of Howard & Sons); and KUNZTHARZ AP keytone resin (a product of Huml/u/ls); ARON KR keytone resin (a product of Toa Gosei Kagaku Kogyo, Japan) and the like.

The ketone resins employed in the dispersions and coatings preferably have an average particle size of one micron or less to aid dispersion within aqueous solvents and enhance the performance of thermal transfer layers in thermal transfer ribbons. These dispersions of ketone resin preferably contain at least 7.5 wt. % ketone resin, more preferably over 12 wt. % ketone resin, based on the total weight of the dispersion.

The poly(ethylene oxide) resin employed in the methods and compositions of this invention are nonionic materials, have a relatively large number of polar groups and are soluble in water. Examples of such resins are those sold by UNION CARBIDE COMPANY under the trademark "POLYOX". These polymers have weight average molecular weights ranging from about 5,000 to about 5,000,000 or more (about 8,000,000). The upper limit for the molecular weight being that wherein the resin is no longer water soluble. It is preferable to employ polymers having weight average molecular weights below 1,000,000, more preferably not above about 600,000 and most preferably not above 300,000 weight average. A 300,000 molecular weight material, sold as POLYOX WSR N-750, has a viscosity at 25 C., for a 2% aqueous solution, of about 40 centipoises (Brookfield Spindle No. 1 at 10 rpm); for a 5% solution this viscosity is about 600–1000 centipoise. Lower molecular weight POLYOX WSR N-80 has a viscosity in the range of 81–105 cps for a 5% solution at 25 C. (using Brookfield Spindle No. 1 at 50 rpm) and a viscosity in the range of 55–95 using model RVF Brookfield viscometer at 2 rpm. Even lower molecular weight POLYOX WSR N-10 has a viscosity of 10–20 centipoise for a 5% solution at 25 C. using a model RVF viscometer at 2 rpm and the smallest spindle available (i.e., 1 or lower). The low viscosity/low molecular weight poly(ethylene oxide)s are preferred for ease of processing. According to the manufacturer, the POLYOX resins typically have a pH of about 10 (in 5% solution).

The poly(ethylene oxide) is generally supplied as a powder and typically has the following particle size distribution when a sample thereof is screened through a series of sieves, expressed as weight percent retained on the indicated Sieve No. screen (U.S. Sieve Series); No. 20–5.2%, No. 40–31.2%; No. 60–20.7%; No. 100–16.7% and through No. 100–balance.

The minimum amount of poly(ethylene oxide) resin in the dispersions of this invention is that which is effective to allow dispersion of the ketone resin in water at ambient temperature. To take advantage of this feature, it is preferable to employ amounts in the range from 3 wt. % to about 12 wt. %, based on the weight of the dispersion. Amounts of poly(ethylene oxide) based on total solids preferably range from 5–40 wt % solids, and most preferably are about 25 wt % solids.

The polymer dispersions of the present invention may contain a small amount of surfactant. The dispersion needs only one surfactant; however, the invention includes the use of two or more surfactants, particularly where a wax or other resin is included. Preferred surfactants include conventional surfactants available commercially and well known to those skilled in the art, examples of which are those available from Air Products Inc. under the trade name "SURFYNOL". The surfactant SURFYNOL GA wetting agent is particularly preferred. The amount of surfactant can vary widely and is preferably used in an amount at least 0.1 wt. %, preferably from 0.1 to 5 wt. %, most preferably 0.2 to 2 wt %, based on the total dispersion and from about 10–20 wt % based on total solids (dry components) within the dispersion.

Anionic, non-ionic, ampholytic, zwitterionic or cationic surfactants can be used, provided the surfactant is substantially solid at temperatures up to about 50 C. Anionic and non-ionic surfactants are preferred. The anionic surfactants can be broadly described as water-soluble salts. Important examples of anionic surfactants are disodium and potassium alkyl sulfates. The non-ionic surfactants can be of the three basic types: the alkaline oxide condensates, the amides and the semi-polar non-ionics. The alkaline oxide condensations are broadly defined as compounds produced by the condensation of alkaline oxide groups with an organic hydrophobic compound which can be aliphatic or alkyl aromatic in nature. Examples of amide-type surfactants include the ammonia, mono-ethanol and di-ethanol amides of fatty acids having an acyl moiety, typically derived from naturally occurring glycerides. Examples of the semi-polar type of non-iophosphinactants are the amine oxides, phosphine oxides and sulfoxides. These materials are described more fully in U.S. Pat. No. 3,819,528.

The water-rich or water-based dispersions of the present invention comprise at least 15 wt. % solids, based on the total weight of the dispersion and preferably ranges from 15–40 wt % solids. The solids comprise a ketone resin, a poly(ethylene oxide) resin and optionally, a surfactant, as described above. The liquid component comprises at least 90% water, preferably at least 95% water and can comprise essentially 100% water. Tap water is preferred over de-ionized water in providing the liquid component of the aqueous dispersions of this invention. Water-rich dispersions typically include a small portion of a volatile, water miscible organic solvent, such as an alcohol. Examples include propylene glycol, N-propanol, glycerine, ethyl ether, 1,3-butanediol, methylisobutylketone, isopropanol, butanol, butyl acetate, and butylcellosolve. It is often desirable that no organic solvent be used, however, amounts of 1 to 10 wt. %, typically about 2 wt %, based on the total weight of the dispersion, of a volatile, water miscible solvent can significantly aid in the dispersion of the ketone resin and enhance certain properties of the resulting coatings.

The aqueous dispersions provided by this invention are stable at room temperature, such that the ketone resin does not precipitate after agitation ceases. Some precipitation may occur with extended periods of storage, but this precipitate can be easily dispersed when preparing a coating formulation from the dispersion. The dispersions of this invention will be free of precipitate for over one hour and preferred embodiments are free of precipitate for weeks and months.

A key feature of the methods and compositions of this invention is the effective use of poly(ethylene oxide), which serves to enhance the ability of the ketone resin to disperse in water. This can be accomplished by incorporating appropriate amounts of poly(ethylene oxide) and, optionally, surfactant in the aqueous solvent used prior to adding and agitating the ketone resin then forming the aqueous dispersion. A solution of poly(ethylene oxide) is prepared by first mixing poly(ethylene oxide) in water with agitation and cooling until the poly(ethylene oxide) is dissolved. This typically takes about 0.5 hours. The surfactant, when used, may be added simultaneously with, before or after addition of the poly(ethylene oxide), but addition after the poly(ethylene oxide) is preferred. Where an optional volatile, water soluble organic solvent is used, it may be incorporated when the poly(ethylene oxide) is added or thereafter. This typically takes a few minutes. A surfactant is then optionally added to the poly(ethylene oxide) solution and allowed to mix. This also takes just a few minutes. The aqueous solution of poly(ethylene oxide) is ready for introduction of the ketone resin, which is added slowly with agitation (typically about 3 hours) and then preferably ground in an attritor to provide solid particles of submicron size.

The process is preferably performed at ambient temperature without heating and the dispersion is cooled where there is significant heat generated by an exotherm during mixing. The dispersion is allowed to cool to room temperature once the ketone resin is dispersed and does not form a precipitate. This method provides a stable dispersion of ketone resin at ambient temperature. These dispersions also allow for the incorporation/dispersion of other components such as wax.

The methods of this invention can be performed using conventional equipment. The agitation/mixing which is required to form the dispersion can be accomplished with a high shear mixer or attritor. The dispersions are often formed in an attritor since the additional components needed to form coating formulations can simply be added to the attritor without transfer.

The dispersions of the present invention can be employed in coating formulations with only minor modifications such as introducing a sensible material (pigment) and/or wax. A sensible material, as defined herein, refers to a material such as a pigment which is capable of being sensed visually, by optical means, by magnetic means, by electro-conductive means or by photoelectric means. The sensible material is typically a coloring agent such as a dye or pigment or magnetic particles. The dispersions of this invention show very good compatibility with a wide array of sensible materials including carbon blacks and magnetic oxides. Several acrylic-based and latex based toning blacks and coloring agents from sources such as Heucotech, Environmental Inks and Daniel Products and BASF Corp are suitable. Any coloring agent used in conventional ink ribbons or thermal transfer ribbons derived from a water based formulation is suitable, including a variety of organic and inorganic coloring pigments and dyes, such as, titanium dioxide, zinc oxide, iron oxide, cobalt oxide, nickel oxide, etc. The sensible material (pigment) is typically used in an amount from about 10 to 40 parts by weight of the total dry ingredients of the coating formulation.

Suitable waxes for use in the coating formulations of this invention are those having a melting point within the range of from 35 C. to 250 C., preferably from 75 C. to 200 C., of submicron size which are water-dispersible or emulsifiable. Such waxes include natural waxes such as carnauba wax, candelilla wax, bees wax and rice bran wax; petroleum waxes such as paraffin wax and synthetic hydrocarbon waxes (e.g. low molecular weight polyethylene and Fisher-Tropsch wax), higher fatty acids such as myristic acid, palmitic acid, stearic acid and behenic acid; higher aliphatic alcohols such as stearyl alcohol and esters such as sucrose fatty acid esters. Mixtures of waxes can also be used. Waxes which are often preferred in the art of thermal transfer ribbons are carnauba wax, montan wax and candelilla wax and paraffin wax. Waxes unique to aqueous coating formulations containing ketone resins are carnauba wax and paraffin wax. Examples of specific waxes are carnauba waxes under the Slip-Ayd series of surface conditioners by Daniel Products Co. The waxes employed within the dispersion preferably have an average particle size of one micron or less (micronized grade) to aid dispersion and provide high quality images.

The amount of wax employed in the coating formulations is at least 5 wt. %, based on total dry components, and typically ranges from 10 to 75 wt. % of the total dry components in the coating formulations which are used to provide functional layers for thermal transfer ribbons. Where a sensible material (pigment) is added to the coating formulation, the amount of wax will typically range from 10–45 wt %, based on dry components.

Additional resin may be optionally introduced to the coating formulation as well. The additional resin is preferably introduced as an aqueous dispersion, emulsion or solution and must be compatible with the dispersion of the present invention. Examples of suitable additional resins are the following: polyvinyl acetate, vinyl chloride-vinyl acetate copolymers, ethylene-vinyl acetate copolymer, ethylene alkyl (meth)acrylate copolymer, ethylene-ethyl acetate copolymer, polyamide, ethyl cellulose, polyurethane resin, acrylic rubber, ethylene alkyl (meth)acrylate copolymer, styrene-alkyl (meth)acrylate copolymer, acrylic acid-ethylene-vinyl acetate terpolymer, saturated polyesters, and sucrose benzoate. Preferred resins include sucrose benzoate, commercially available from Velsicol as an alcohol soluble resin, and rosin esters, commercially available from Hercules, Inc. under the trade name "Stabelite" resin. The additional resin is preferably compatible with the wax such that it does not separate out. Such compatibility is necessary to ensure a high loading of ketone resin for producing images with high scratch and smear resistance.

To provide high scratch and smear resistant images on synthetic resin substrates, the ketone resin should comprise 30–90 wt. %, based on total dry ingredients, of the coating formulation. In preferred embodiments, the ketone resin comprises at least 50 wt % of the total dry ingredients. The composition of the coating formulation can be controlled so as to adjust the temperature at which the coating is transferred to the receiving substrate. Preferred thermal transfer ribbons contain coatings of thermal transfer material which comprise 5% to 25 wt. % wax, 40 to 65 wt. % ketone resin, 5–10 wt. % poly(ethylene oxide) and 5 to 40 wt. % pigment based on the total weight of dry ingredients.

Additional aqueous or organic solvents may also be added to adjust the solids content of the coating formulation, which preferably ranges from about 10 to 60 % solids, most preferably 15 to 35 wt. % solids, but includes formulations with solids contents outside of this range.

The coating formulation may contain other components or additives such as those described in U.S. Pat. No. 3,663,278 to aid in processing. Suitable additives include plasticizers such as adipic acid esters, phthalic acid esters, linoleic acid esters, sebacic acid esters, succinic acid esters, chlorinated biphenyls, citrates, epoxides, glycerols, glycols, hydrocarbons, chlorinated hydrocarbons, phosphates and the like. The plasticizer typically provides low temperature sensitivity and flexibility to the coatings formed so as not to flake off the substrate. Other additives which may be used include weatherability improvers such as UV light absorbers fillers and grinding aids such as SURFYNOL CT-131 acetylinic diol wetting agent and wetting agents (SILWET C-77 polyalkylene oxide modified heptamethyltrisiloxane wetting agent Thermal transfer ribbons of this invention can be prepared by conventional techniques from a coating formulation of the present invention, an example being the use of a Meyer Rod® or like wire-round doctor bar set-up on a typical coating machine to provide a coating thickness preferably in the range of 0.0001 to 0.0004 inches. In most cases, the temperature of the coating is maintained at ambient temperature. After the coating is applied to the substrate, the substrate is passed through a dryer at an elevated temperature to ensure drying and adherence of the coating to the substrate of the thermal transfer ribbon. The adhered coating is a thermal transfer layer which comprises a sensible material as described above dispersed in a binder. The binder comprises the ketone resin, poly(ethylene oxide) and wax in amounts corresponding to the composition of solids in the coating formulation.

Suitable substrates comprise a flexible material which is preferably a thin smooth paper or plastic-like material. The tissue-type paper material such as 30 to 40 gauge capacitor tissue, manufactured by Glatz and polyester-type plastic material such as 14 to 35 gauge polyester film manufactured by DuPont under the trademark Mylar® are suitable. Polyethylene naphthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within the thermal print head. The thickness is preferably from 3 to 50 $\mu$m. If desired, the substrate or base film may be provided with a backcoating on the surface opposite the thermal transfer layer to minimize print head wear and prevent adherence to the print head. The thermal transfer layer is preferably fully transferred from the substrate medium onto a receiving substrate at a temperature in the range of about 100 C. to 250 C. to provide all the advantages of thermal printing.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLES

Example 1

Preparation of Dispersion

The ingredients described below in Table 1 are added to a clean beaker with an impeller for stirring to form a dispersion according to the method which follows.

TABLE 1

| Ingredient | % Dry | Batch Dry | Batch Wet | Range - % Dry |
|---|---|---|---|---|
| 1. POLYOX (Resin) | 10.0 | 10.0 | 10.0 | 10–40 |
| 2. K-1717 Ketone Resin | 80.0 | 80.0 | 80.0 | 50–80 |
| 3. Surfynol GA (Wetting Agent) | 10.0 | 10.0 | 10.0 | 5–20 |
| 4. Water (Cold) | — | — | 400.0 | — |
| TOTAL | 100.0 | 100.0 | 500.0 | |

% Solids - 20 (Approx.)

POLYOX N-10 resin is dissolved in cold water with agitation. After the Polyox is dissolved, SURFYNOL GA (wetting agent) is added to the cold Polyox mix. The Polyox solution is milky before and after addition of SUFYNOL GA acetylinic diol. K-1717 ketone resin from Lawter International, Inc., is slowly added with vigorous stirring. The dispersion becomes creamy white after one-half hour of vigorous agitation. Vigorous agitation is stopped after several hours and the dispersion is removed from the beaker vessel. No evidence of precipitation is observed and the impeller and beaker cleanly rinse off easily with no caking or residue.

Preparation of Coating Formulation

Using the dispersion prepared in Example 1, a coating formulation is prepared by adding the following ingredients to the beaker with agitation.

TABLE 3

| Ingredient | % Dry | Batch Dry | Batch Wet |
|---|---|---|---|
| 1. Emulsion from above @ 20% solids | 50.0 | 50.0 | 250.0 |
| 2. Water | — | — | 80.0 |
| 4. Carnauba @ 25% solids[1] | 40.0 | 40.0 | 160.0 |
| 5. Carbon Black Powder | 10.0 | 10.0 | 10.0 |
| TOTAL | 100.0 | 100.0 | 500.0 |

[1] A very fine water-based emulsion of carnauba.
% Solids - 20 (Approx.)

Preparation of a Thermal Transfer Medium

The above coating formulation is applied to a polyester substrate by a hand draw-down with a Myer rod. No streaks were observed. Full transfer of the coating formed is observed at a temperature of 185 F on a step-wedge. The image shows good smear resistance.

The preceding examples can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing an aqueous dispersion of ketone resin which is stable at ambient temperature, said method comprising agitating a ketone resin and water in the presence of a water-soluble poly(ethylene oxide) resin, and optionally a surfactant, wherein water comprises at least 95 wt. % of the total liquid component of said dispersion, wherein said ketone resin is the result of a condensation reaction between an aldehyde and a ketone, has a melting point below 300° C., is insoluble in water and non-dispersible in pure water at ambient temperature wherein the poly(ethylene oxide) is dissolved in the water prior to adding the keytone resin.

2. A process as in claim 1, wherein a solvent in an amount of from 0.5 to 5 wt. %, based on the total weight of said dispersion, selected from the group consisting of propylene glycol, N-propanol, glycerine, ethylether, 1,3-butanediol, methylisobutyl ketone, isopropanol, butanol, butylacetate and butylcellosolve, is added to the water prior to agitating the ketone resin and said water.

3. A process as in claim 1, wherein the amount of ketone resin agitated with water is at least 12 wt. % based on the weight of the dispersion produced and the amount of poly (ethylene oxide) present during agitation of said ketone resin and water is 3–12 wt. %, based on the weight of the dispersion produced.

4. A process for producing an aqueous dispersion of ketone resin which is stable at ambient temperature, said method comprising agitating a ketone resin and water, without heating and in the absence of an organic solvent, in the presence of a water-soluble poly(ethylene oxide) resin, and optionally a surfactant, wherein water comprises at least 95 wt. % of the total liquid component of said dispersion, wherein said ketone resin is the result of a condensation reaction between an aldehyde and a ketone, has a melting point below 300° C., is insoluble in water and non-dispersible in pure water at ambient temperature, wherein the said water soluble poly(ethylene oxide) is dissolved in the water prior to adding the ketone resin.

5. A process as in claim 4, which comprises the additional step of adding, with agitation, a water-soluble or water-emulsifiable wax to the aqueous dispersion of ketone resin and water formed.

6. An aqueous dispersion of ketone resin prepared by the process of claim 4 which contains at least 7.5 wt. % ketone resin based on the weight of the dispersion.

7. An aqueous dispersion of a ketone resin containing at least 15 wt. % solids, which is stable at ambient temperature, said dispersion comprising:
 (a) a liquid component which comprises over 95 wt. % water, based on the weight of said liquid component;
 (b) at least 7.5 wt. % based on the total weight of the dispersion, of a solid ketone resin prepared by a condensation reaction between an aldehyde and a ketone, having a melting point below 300° C., which is insoluble in water and non-dispersible in pure water at ambient temperature; and
 (c) about 3 wt. % to 12 wt. %, based on the total weight of the dispersion, of a solid water-soluble poly(ethylene oxide) resin and additionally
 (d) at least 0.1 wt % of a surfactant, based on the total weight of the aqueous dispersion, wherein the said water soluble poly(ethylene oxide) is dissolved in the water prior to adding the ketone resin.

8. An aqueous dispersion of a ketone resin containing at least 15 wt. % solids, which is stable at ambient temperature, said dispersion comprising:
 (a) liquid component:
 (b) at least 7.5 wt. %, based on the total weight of the dispersion, of a solid ketone resin prepared by a condensation reaction between an aldehyde and a ketone, having a melting point below 300° C., which is insoluble in water and non-dispersible in pure water at ambient temperature; and
 (c) about 3 wt. % to 12 wt. % based on the total weight of the dispersion, of a solid water-soluble poly(ethylene oxide) resin and additionally (d) at least 0.1 wt. % of a surfactant, based on the total weight of the aqueous dispersion, wherein the liquid component consists only of water, wherein the said water soluble poly(ethylene oxide) is dissolved in the water prior to adding the ketone resin.

9. A dispersion as in claim 7, wherein the liquid component additionally containing an alcohol solvent in an amount of from 0.5–5 wt. %, based on the total weight of said aqueous dispersion, said alcohol solvent is selected from the group consisting of propylene glycol, N-propanol, glycerine, ethylether, 1,3-butanediol, methylisobutyl ketone, isopropanol, butanol, butylacetate and butylcellosolve.

10. An aqueous dispersion as in claim 8, wherein the ketone resin has a melting/softening point in the range of about 70 C. to 140 C. and is an alkali condensate of a ketone selected from the group consisting of acetone, methylethyl ketone, methylnaphthyl ketone, propiophenone, cyclohexanone, methylcyclohexanone, p-tertbutyl cyclohexanone and acetophenone.

11. An aqueous dispersion as in claim 10, wherein the ketone resin is derived from co-condensation of a ketone and a lower aliphatic aldehyde selected from the group consisting of formaldehyde, acetaldehyde, propionaldehyde and butylaldehyde.

12. A dispersion as in claim 8, wherein the amount of ketone resin within the aqueous dispersion falls within the range of 30–90 wt. % based on the weight of total solids, and the amount of poly(ethylene oxide) resin within the aqueous dispersion falls within the range of 5–40 wt. % based on the total weight of solids.

13. An aqueous dispersion as in claim 1 which additionally contains a wax in on amount of at least 10 wt. %, based on the weight of total solids.

14. A coating formulation which comprises:
(a) an aqueous dispersion of claim 7; and
(b) a water-soluble or emulsifiable wax in an amount of at least 10 wt. % based on the weight of total solids.

15. A coating formulation which comprises:
(a) an aqueous dispersion of claim 8; and
(b) a water-soluble or emulsifiable wax in an amount of at least 10 wt. % based on the weight of total solids and which is free of organic solvent, wherein the said water soluble poly(ethylene oxide) is dissolved in the water prior to adding the ketone resin.

16. A coating formulation as in claim 15, wherein the amount of water-soluble or emulsifiable wax falls within the range of 15–45 wt. % based on the weight of total solids and the amount of ketone resin falls within the range of from 15–45 wt. %, based on the weight of total solids.

17. A coating formulation as in claim 15 which additionally comprises a sensible material in an amount of 10–40 wt. %, based on the weight of total solids.

18. A coating formulation as in claim 15, wherein the water-soluble or emulsifiable wax is selected from the group consisting of carnauba wax and paraffin wax.

19. A coating formulation as in claim 17 which provides thermally sensitive coatings for thermal transfer ribbons that form images on a receiving substrate by thermal transfer printing, wherein the sensible material is carbon black.

* * * * *